United States Patent [19]
Le Guillon

[11] 3,986,503
[45] Oct. 19, 1976

[54] MOUNTING MEANS FOR MACHINES

[75] Inventor: John Alexander Le Guillon, Aurora, Ill.

[73] Assignee: Caterpillar Tractor Co., Peoria, Ill.

[22] Filed: Sept. 22, 1975

[21] Appl. No.: 615,440

[52] U.S. Cl. .................................. 182/89; 280/166
[51] Int. Cl.² ........................................... B60R 3/00
[58] Field of Search ............... 182/89, 91; 280/166; 248/293, 291, 240.4

[56] References Cited
UNITED STATES PATENTS

| | | | |
|---|---|---|---|
| 835,992 | 11/1906 | Truax | 248/293 |
| 2,417,987 | 3/1947 | McFarland | 280/166 |
| 3,561,713 | 2/1971 | Berkowitz | 248/291 |

*Primary Examiner*—Reinaldo P. Machado
*Attorney, Agent, or Firm*—Phillips, Moore, Weissenberger, Lempio & Strabala

[57] ABSTRACT

A step apparatus comprised of a bracket and a step assembly is adapted to be affixed to a machine such as an excavator. The step assembly is mounted in the bracket and pivotable to first and second positions relative to the bracket. A resilient means associated with the step assembly urges the step assembly toward the second position. Locking means are operatively connected with the bracket and the step assembly. The step assembly is urged in a first direction while in its first position relative to the bracket by the resilient means to engage the locking means and secure the step assembly in its first position. The step assembly is movable in a second direction while in its first position to disengage the locking means to allow the step assembly to be urged to its second position.

5 Claims, 4 Drawing Figures

U.S. Patent  Oct. 19, 1976  3,986,503
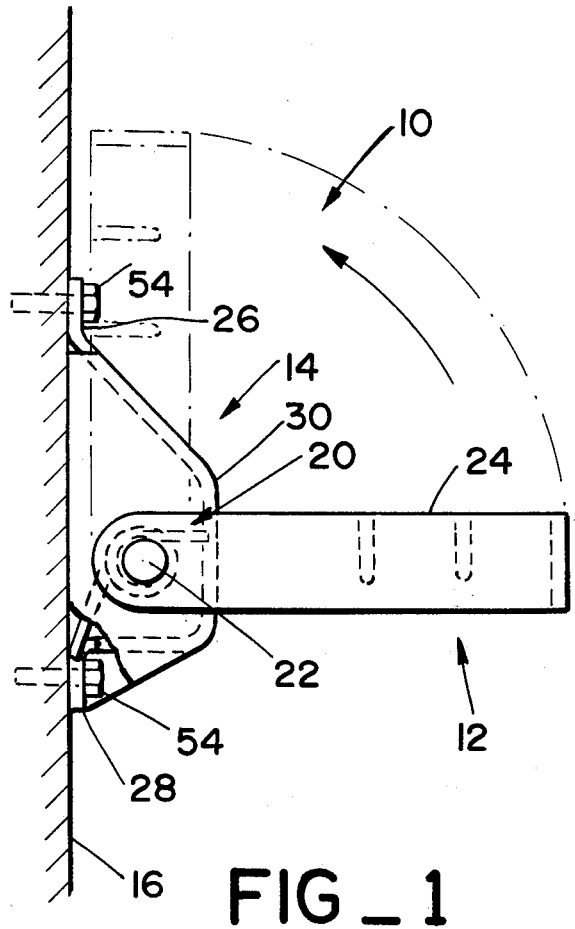
FIG_1
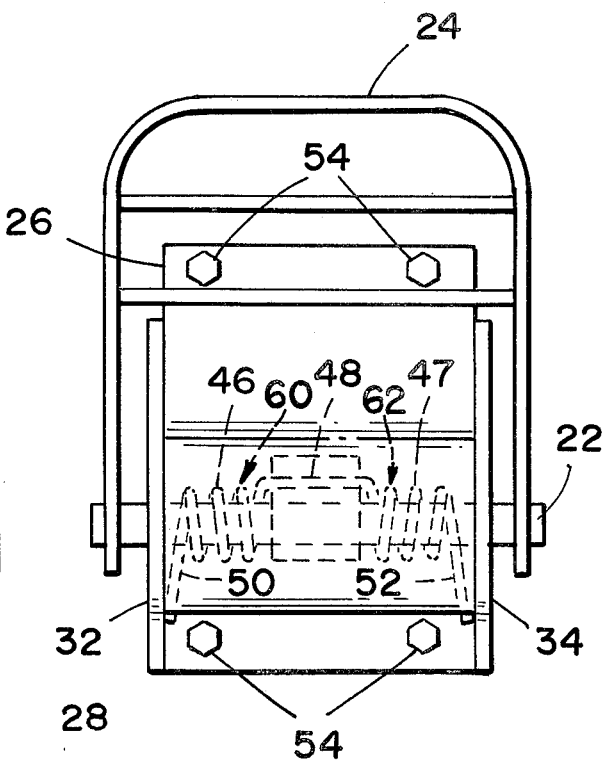
FIG_2
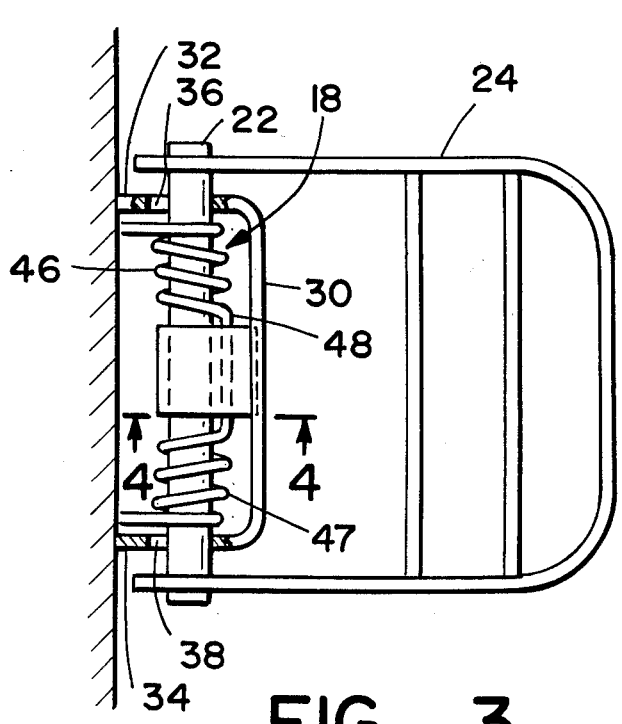
FIG_3
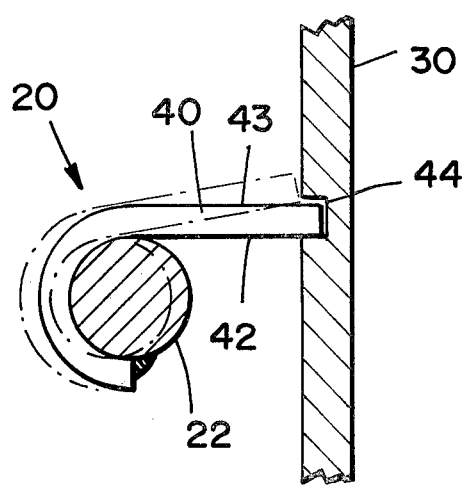
FIG_4

MOUNTING MEANS FOR MACHINES

BACKGROUND OF THE INVENTION

Large machines such as earthmoving machines require some means for mounting the machine in order to enter the operator's cab or to perform maintenance on the machine. Various methods have been devised to provide such mounting means; however, to mount a step exterior of the vehicle frame such that the step is not broken off when it is struck by an object presents a particular problem. Accordingly, removable steps or retracting steps have been developed for such use. Such retracting steps, unless made to retract upon removal of the operator's weight from the step or upon being struck by an object still suffer from the difficulty of being broken off when struck by an object if left in the operative position. Nevertheless, steps which automatically retract are still subject to breakage, therefore it is desirable to design such a step so that it may be replaced both economically and easily in the field.

SUMMARY OF THE INVENTION

Accordingly, it is an object of this invention to provide a mounting means for a machine which is movable to a stowed position when not in use.

It is a further object of this invention, while fulfilling the above object, to provide a mounting means for a machine which will move to the stowed position when struck by an object.

It is a still further object of this invention, while fulfilling the above objects, to provide a mounting means which is economical to produce.

It is another object of this invention to provide a step, while providing for the objects set forth above, to provide a mounting means which is easily replaceable under operating conditions.

Broadly stated, the invention is a mounting means comprising a bracket having mounted thereon a step assembly pivotable to a first position relative to the bracket and pivotable to a second position relative to the bracket and movable in first and second generally opposite directions relative to said bracket independently of said pivoting. A resilient means is included for urging the step assembly toward the second position, and a locking means is also provided, the locking means being operatively connected with the step assembly and the bracket. The step assembly when moved in the first direction while in its first position causes engagement of the locking means to take place to retain the step in its first position, and when moved in the second direction while in its first position causes disengagement of the locking means to take place to allow resilient means to urge the step assembly to the second position.

BRIEF DESCRIPTION OF THE DRAWINGS

These and other objects of the invention will become apparent from the study of the following drawings in which:

FIG. 1 is a side elevation view of the mounting means in the first position.

FIG. 2 is a front elevation view of the mounting means in the second position.

FIG. 3 is a plan view of the mounting means in the first position with the bracket assembly partly broken away.

FIG. 4 is a detailed view of the locking stub taken at line IV—IV of FIG. 3.

DETAILED DESCRIPTION OF THE PREFERRED EMBODIMENT

Illustrated in FIG. 1 is a mounting means 10 in accordance with this invention. The step assembly 12 is mounted on a bracket 14, the bracket being adapted to be affixed to a structure 16 such as an earthmoving machine. A resilient means 18 (see FIG. 3) is provided to pivotably urge the step assembly 12 to a second or stowed position as shown by the dashed lines in FIG. 1. Locking means 20, operatively connected with bracket 14 and step assembly 12, provides a locking relationship between step assembly 12 and bracket 14 to secure step assembly 12 in a first or operative position as shown in FIG. 1.

Bracket 14 is comprised of an upper mounting flange 26 and a lower mounting flange 28. Bracket 14 also comprises a central locking portion 30 offset from upper mounting flange 26 and lower mounting flange 28 and integrally formed therewith. Bracket 14 has two laterally disposed end portions 32 and 34 integrally formed with central locking portion 30 and substantially perpendicular thereto. Defined in end portions 32 and 34 are horizontally oriented elongated slots 36 and 38 with step member 24 rigidly affixed to shaft 22 exterior of end portions 32 and 34. A locking stub 40 is rigidly affixed at or near the midpoint of shaft 22 and extends outwardly therefrom. In the illustrated embodiment locking stub 40 is affixed to shaft 22 so that a surface 42 of locking stub 40 extends tangentially therefrom. Central locking portion 30 of bracket 14 defines a notch 44 of dimension sufficient to receive locking stub 40. Notch 44 is located adjacent to and laterally offset from shaft 22 so that locking stub 40 when disposed therein will allow step assembly 12 to lie in a generally horizontal plane relative to structure 16 thereby allowing an operator to mount structure 16 utilizing step member 24 as a footrest.

Referring to FIG. 3, resilient means 18 are comprised of a coiled spring disposed around shaft 22 having a first helical portion 46 wound in one direction and a second helical portion 47 wound in the other opposite direction. A center spacing portion 48 of resilient means 18 interconnects the two helical portions and is generally axially aligned with shaft 22, the center portion 48 engaging tangential surface 42 of locking stub 40. The free end 50 of first helical portion 46 and the free end 52 of second helical portion 47 extend outwardly and downwardly from shaft 22 to engage bracket 14 as shown in FIG. 2, or alternatively structure 16 while bracket 14 is affixed thereto. Resilient means 18, formed as described and disposed on shaft 22 as illustrated, are wound when step assembly 12 is rotated in the clockwise direction as viewed in FIG. 1 to store energy, thereby providing a force sufficient to urge step member 24 to the second or stowed position upon disengagement of locking stub 40 from notch 44 of bracket 14.

Slot 36 and slot 38 are generally of the shape of a horizontally oriented elongated hole allowing step assembly 12 to move in first and second generally opposite directions relative to bracket 14, such movement independent of the aforementioned pivotable motion. The construction of resilient means 18, with free end 50 and free end 52 engaging bracket 14, urges step assembly 12 in the first direction relative to bracket 14.

The same motion in the first direction occurs when free ends 50 and 52 engage structure 16. Such urging of step assembly 12 results from "bowing" of resilient means 18 when wound, with the coils 60 and 62 of helical portions 46 and 47 adjacent to center portion 48 moving generally in said first direction to act on shaft 22. Thus, it can be seen that locking stub 40 which is rigidly affixed to shaft 22 will be urged into notch 44 to secure step assembly 12 in the first or operative position as illustrated in FIG. 1.

Although operation of the mounting means 10 is evident from the description set forth above, such operation will be briefly reviewed. Mounting means 10 may be affixed to a structure 16 by bracket 14 using suitable methods well-known in the art, such as a plurality of bolts 54. Free end 50 and free end 52 of resilient means 18 may constructed so that upon affixing bracket 14 to structure 16, a certain degree of tensioning of resilient means 18 occurs by winding resilient means 18. Such pretensioning of resilient means 18, which may be accomplished on assembly if free ends 50 and 52 engage bracket 14, insures that step member 24 will normally seek the second or stowed position as shown by the dotted lines in FIG. 1. To position step member 24 in the first or operative position, as shown in FIG. 1, a force is applied to step member 24 to pivot step member 24 in the clockwise direction as seen in FIG. 1. Resilient means 18, as stated above, will urge step assembly 12 in the first direction relative to bracket 14 so that locking stub 40 will engage notch 44 as illustrated in FIG. 4. With locking stub 40 engaging notch 44, step member 24 is secured in a generally horizontal position relative to structure 16. To stow step member 24, a force is applied laterally to step member 24 against resilient member 18 to move step assembly 12 in the second direction relative to bracket 14. Such movement disengages locking stub 40 from notch 44 as illustrated by the dotted lines in FIG. 4. With locking stub 40 disengaged from notch 44 the wound tension in resilient means 18 urges step assembly 12 to the second or stowed position. In the event the operator fails to stow step assembly 12 as described above, any force applied to step assembly 12 to urge the step assembly in a second direction will disengage locking stub 40 and cause the step assembly to be pivotally urged to the stowed position.

Step member 24 is shown in the preferred embodiment as a U-shaped member affixed at each end to shaft 22 with two laterally disposed cross-members. Such construction should not be considered in any way limiting, any suitable step member may be substituted therefor.

What is claimed is:

1. A step apparatus comprising:
    a bracket;
    a step assembly mounted on the bracket, pivotable to a first position relative to the bracket and pivotable to a second position relative to the bracket, and movable in first and second generally opposite directions relative to said bracket independently of said pivoting;
    resilient means for pivotably urging said step assembly toward the second position and for urging said step assembly in the first direction; and
    locking means operatively connected with the bracket and step assembly,
    said step assembly being movable in said first direction relative to the bracket wherein with the step assembly in its first position engagement of the locking means takes place to secure the step assembly in said first position, and movable in said second direction relative to the bracket wherein with the step assembly in its first position, disengagement of the locking means takes place to allow the resilient means to urge said step assembly to the second position.

2. The apparatus as set forth in claim 1 wherein the step assembly comprises:
    a shaft rotatably mounted in said bracket; and
    a step member extending outwardly of said shaft and rotatable therewith.

3. The apparatus as set forth in claim 2 wherein the locking means comprise:
    a locking stub rigidly affixed to the shaft and extending outwardly thereof generally in the same direction as said step member;
    and wherein the bracket defines a notch of dimension sufficient to receive said locking stub, said notch located adjacent to and laterally offset from said shaft.

4. The apparatus as set forth in claim 3 wherein said locking stub is tangentially affixed to said shaft defining an outwardly extending surface tangentially oriented with said shaft; and further wherein said resilient means comprises a coil spring disposed around said shaft having a first helical portion wound in one direction, a second helical portion wound in the other opposite direction, and a center spaced portion interconnecting the two helical portions, the center spaced portion generally longitudinally aligned with the shaft and engaging the tangential surface of the locking stub, the ends of the helical portions of said coil spring formed to lie adjacent to and engage said bracket, said coil spring urging said assembly in a first direction and wound to store energy while said step is in its first position.

5. The apparatus as set forth in claim 4 wherein said bracket is comprised of upper and lower mounting flange portions, a centrally disposed locking portion offset from said flange portions and defining the locking notch for receiving the locking stub, and laterally disposed end portions integrally formed with said center portion and generally perpendicular thereto, each end portion defining a horizontally oriented slot, said shaft member disposed through said horizontally oriented slots in said end portions with the coil spring interposed between said end portions, said step member rigidly affixed to said shaft exterior of said end portions,
    said horizontally oriented slots allowing for pivotal motion and motion in said first and second generally opposite directions of said step assembly.

* * * * *